United States Patent [19]
Sugita et al.

[11] Patent Number: 5,993,927
[45] Date of Patent: Nov. 30, 1999

[54] PERMEABLE ADHESIVE TAPE AND A PROCESS FOR PREPARING THE SAME

[75] Inventors: Koichi Sugita, Ibaraki; Katsuyuki Nakaido, Nara; Kusutaro Yoshida, Sakai, all of Japan

[73] Assignee: Rikidyne Co., Ltd, Nara, Japan

[21] Appl. No.: 08/956,491

[22] Filed: Oct. 23, 1997

[30] Foreign Application Priority Data

Oct. 30, 1996 [JP] Japan ................................. 8-288205
Aug. 8, 1997 [JP] Japan ................................. 9-214824

[51] Int. Cl.⁶ ........................................................ C09J 7/02
[52] U.S. Cl. ...................... 428/40.2; 428/41.3; 428/41.5; 428/41.8; 428/323; 428/327; 428/906; 602/903
[58] Field of Search .................................. 428/40.1, 40.2, 428/41.3, 41.5, 41.8, 323, 327, 906; 602/903

[56] References Cited

U.S. PATENT DOCUMENTS

| 4,735,837 | 4/1988 | Miyasaka et al. ................. 428/40.1 |
| 4,789,413 | 12/1988 | Tani et al. ................................. 156/77 |
| 5,198,064 | 3/1993 | Tani et al. ............................... 156/289 |

FOREIGN PATENT DOCUMENTS

| 0 257 984 | 3/1988 | European Pat. Off. . |
| 63195682 | 8/1988 | Japan . |
| 07168878 | 7/1995 | Japan . |
| WO 96/11116 | 4/1996 | WIPO . |

*Primary Examiner*—Nasser Ahmad
*Attorney, Agent, or Firm*—Cohen, Pontani, Lieberman & Pavane

[57] ABSTRACT

A permeable adhesive tape comprising a porous or permeable backing, a natural rubber-base, synthetic rubber-base or acrylic-base pressure sensitive adhesive layer and a release sheet in this order, wherein the pressure sensitive adhesive layer has permeable pores containing elastic microspheres.

6 Claims, No Drawings

PERMEABLE ADHESIVE TAPE AND A PROCESS FOR PREPARING THE SAME

BACKGROUND OF THE INVENTION

This application is related to Japanese applications Nos. Hei 08(1995)-288205 and Hei 9(1997)-214824 filed on Oct. 30, 1996 and Aug. 8, 1997, respectively, whose priorities are claimed under 35 USC § 119, the disclosures of which are incorporated by reference in its entirety.

1. Field of the Invention

The present invention relates to a permeable adhesive tape and a process for preparing the same, more particularly a permeable adhesive tape taken up in a roll whose permeability never or hardly deteriorates with time and a process for preparing the same.

2. Description of Related Art

Conventionally used adhesive tapes such as sticking plasters, bandages and surgical cloths are adhered on skin in use. When adhered and maintained on skin for a long time, the adhesive tapes may cause a rash, an eruption or maceration on skin. For avoiding this problem, it is desirable that the adhesive tapes have permeability.

U.S. Pat. No. 4,789,413 discloses a process for preparing an adhesive tape having permeability, which process includes dispersing a water-absorptive high-molecular weight substance containing water uniformly in a rubber-base or acrylic pressure sensitive adhesive solution in an organic solvent, applying this dispersion onto a release sheet, followed by drying, and then laminating a porous backing onto the dispersion-applied surface.

In general, the adhesive tape is wound up on a bar core into the form of a roll when manufactured in a factory, and then stored or shipped in the form of the roll before processed into a desired shape.

Conventionally the tape wound up in a roll receives a considerable winding pressure. (Here, the winding pressure means a force acting on an adhesive tape wound on a bar core in a roll.) Especially, the winding pressure is considerably high around the center of the roll. This winding pressure may fluidize the pressure sensitive adhesive in the adhesive tape, which may then fill permeable pores of the adhesive tape, most remarkably around the center of the roll. Thus the adhesive tape gradually loses its permeability with time. Furthermore, after aging, the adhesive tape is cut to a width of a desired product, and also wound up in a small roll, which is called a product roll, for convenience of storage. Since the tape in the form of the product roll also receives the winding pressure, it is impossible to prevent deterioration of permeability with time even of the product roll.

For preventing or easing the deterioration of permeability, it is known to wind a paper tube (a core) with polyethylene foam or the like and take up the adhesive tape on the paper tube so that the winding pressure is relaxed. Also it is known to take up the adhesive tape less tight at a controlled wind-up tension.

However, in the former way, the polyethylene foam must be formed thick to sufficiently relax the winding pressure, and the thick foam may cause deformation of the tape. In the latter way, the loosely taken-up roll may lose its shape easily.

It is also known to add hydrophobic inorganic particles such as silica into the pressure sensitive adhesive layer from U.S. Pat. No. 5,198,064. The hydrophobic inorganic particles described in this publication, however, are added not for the purpose of ensuring the permeability but for the purpose of preventing contact of water contained in a permeability-providing agent with a crosslinker added for improvement of the adhesion of the pressure sensitive adhesive layer. Therefore, it is impossible to prevent the permeability from deteriorating due to the winding pressure even by adding the hydrophobic inorganic particles.

Further it is known from Japanese Unexamined Patent Publication (Kokai) No. Hei 2(1990)-45582 to apply an adhesive liquid containing hollow microspheres onto a permeable backing with pores having an average pore diameter of 1 to 50 µm, and partially remove the self-adhesive liquid by gas blowing or air suction through the pores of the permeable backing so as to form a permeable adhesive layer containing pores. However, the size of pores formed by gas blowing or air suction is generally small in correspondence with the pores of the permeable backing, and therefore sufficient permeability cannot be obtained in the adhesive layer. Furthermore, in the case where the pores are formed by gas blowing, the surface of the adhesive layer is roughened. In the case where the pores are formed by air suction, on the other hand, the adhesive liquid leaks out onto a surface of the permeable backing opposite to the adhesive-applied surface.

SUMMARY OF THE INVENTION

In view of the above problems, the present invention provides a permeable adhesive tape comprising a porous or permeable backing, a pressure sensitive adhesive layer of a natural rubber-base, synthetic rubber-base or acrylic pressure sensitive adhesive and a release sheet in this order, wherein the pressure sensitive adhesive layer has permeable pores containing elastic microspheres.

In another aspect, the present invention provides a process for preparing a permeable adhesive tape comprising dispersing non-hollow elastic microspheres, hollow elastic microspheres or expandable microspheres homogeneously in a permeability-providing agent to obtain a first dispersion, dispersing the first dispersion in a solution of a pressure sensitive adhesive to which a crosslinker is optionally added, in order to obtain a second dispersion, applying the second dispersion onto a release sheet, followed by drying, while the expandable microspheres, if used, are converted to hollow elastic microspheres, thereby to form a pressure sensitive adhesive layer having permeable pores containing non-hollow elastic microspheres or hollow elastic microspheres, and then laminating a porous backing or a permeable backing on the pressure sensitive adhesive layer.

In a further aspect, the present invention provides a process for preparing a permeable adhesive tape comprising homogeneously dispersing non-hollow elastic microspheres, hollow elastic microspheres or expandable microspheres in a system in which a permeability-providing agent and optionally a crosslinker are homogeneously dispersed in a solution of a pressure sensitive adhesive, applying the dispersion onto a release paper, followed by drying, while the expandable microspheres, if used, are converted to hollow elastic microspheres, thereby to form a pressure sensitive adhesive layer having permeable pores containing non-hollow elastic microspheres or hollow elastic microspheres, and then laminating a porous backing or a permeable backing on the pressure sensitive adhesive layer.

DESCRIPTION OF THE PREFERRED EMBODIMENTS

The above and other objects, features and advantages of the present invention will become apparent from the following description of embodiments.

As the pressure sensitive adhesive composing the pressure sensitive adhesive layer, usable are nature rubber-base, synthetic rubber-base and acrylic adhesives. The adhesive may suitably be selected from those which can be used in the art. Particularly, a pressure sensitive adhesive disclosed in U.S. Pat. No. 4,789,413 is introduced here for reference. Further, a tackifier, a plasticizer, an anti-oxidant and a preservative may be added singly or as a mixture of two or more thereof.

The pressure sensitive adhesive layer may preferably be 20 to 100 μm in thickness after drying. More preferable thickness is 35 to 75 μm after drying. In the pressure sensitive adhesive layer, a number of permeable pores are formed. The term "permeable" used in the present invention means a characteristic of being permeated by gases such as air and water vapor. The degree of permeability is represented by a value measured in accordance with a JIS (Japanese Industrial Standard) L-1099-$_{1993}$ A-2 (water) test. The size of the permeable pores is such that the pores can communicate with one surface and the opposite surface of the pressure sensitive adhesive layer.

Further, according to the present invention, the pressure sensitive adhesive layer has permeability, and part of or all the permeable pores thereof contain elastic microspheres in such a degree that the elastic microspheres do not hinder the permeability.

As the elastic microspheres, either non-hollow elastic microspheres or hollow elastic microspheres can be used.

Examples of materials for the non-hollow elastic microspheres include urethane polymers, acrylic rubbers such as copolymers of ethyl acrylate and chloroethyl vinyl ether, copolymers of n-butyl acrylate and acrylonitrile and copolymers of ethyl acrylate and acrylonitrile, and urethane modified acrylic rubbers.

Examples of materials for the hollow elastic microspheres include crosslinked styrene polymers, styrene-acrylonitrile copolymers, polymers such as methyl methacrylate-acrylonitrile and vinylidene chloride-acrylonitrile.

The diameter of the elastic microspheres is, for example, 10 to 100 μm, preferably 15 to 80 μm, in average particle diameter. According to the present invention, it is preferable that the elastic microspheres exist at least in permeable pores, but the elastic microspheres may also be contained in other part of the pressure sensitive layer than the permeable pores. The elastic microspheres may preferably be used in a ratio of 0.01 to 5.0 parts by weight to 100 parts by weight of the pressure sensitive adhesive (in terms of solid content). If the elastic microspheres are used in a ratio less than 0.01 parts by weight, it is not preferable because the obtained permeable adhesive tape cannot retain sufficient permeability. If the elastic microspheres are used in a ratio more than 5.0 parts by weight, it is not preferable because sufficient adhesion cannot be obtained. The particularly preferable use ratio of the elastic microspheres is 0.1 to 3.0 parts by weight.

In the case where the hollow elastic microspheres are used, it is preferable that the microspheres are those expanded. For example, the hollow elastic microspheres more preferably has an expansion ratio of 20 to 70 times (volume) and are solvent-resistant. As discussed in the following description of preparation processes, the above-described hollow elastic microspheres may also be provided by expanding expandable microspheres during the preparation of the permeable adhesive tape.

The term "elastic" used in the present invention means that, when a pressure of 200 kg/cm$^2$ is applied to water in which microspheres are dispersed, the volume of the microspheres recovers more than 90% after the pressure is relieved.

The permeable pores in the pressure sensitive adhesive layer are formed by the evaporation of water contained in a water-absorptive high-molecular weight substance added to the pressure sensitive adhesive solution during the preparation of the pressure sensitive adhesive layer. The water-absorptive high-molecular weight substance here is one of those insoluble in water which swell by absorbing water of several hundred to one thousand times the weight of itself, the swelled substance never freeing the absorbed water even under pressure. Examples of such water-absorptive high-molecular weight substances include starch polymers such as a starch-acrylonitrile graft polymer, a starch-acrylic acid graft polymer, a starch-styrenesulfonic acid graft polymer and a starch-vinylsulfonic acid graft polymer; cellulose polymers such as a cellulose-acrylonitrile graft polymer, a cellulose-styrenesulfonic acid graft polymer and a crosslinked carboxymethyl cellulose polymer; polyvinyl alcohol polymers such as a crosslinked polyvinyl alcohol polymer, a saponified polyacryl-vinyl acetate polymer; acrylic polymers such as a crosslinked polyacrylate polymer (a crosslinked sodium acrylate polymer, a crosslinked acrylic acid-sodium acrylate polymer) and a saponified acrylonitrile polymer; polyethylene oxide polymers such as a crosslinked ethylene glycol diacrylate polymer; other polymers having a carboxyl group, carboxylate, hydroxy group and/or sulfonate, and a crosslinked polyvinylpyrrolidone polymer. Particular examples are AP-300, AP-200 and AP-100 of AQUARESERVE series (crosslinked acrylic acid-sodium acrylate copolymers manufactured by Nippon Synthetic Chemical Industry Co., Ltd.), AQUARIC CA series (crosslinked sodium acrylate polymers manufactured by Nippon Shokubai Co., Ltd.), and SANWET IM-1006MPS (sodium salt of starch-acrylic acid graft polymer manufactured by Sanyo Chemical Industries, Ltd.). These water-absorptive high-molecular weight substances are used together with water as discussed in the following explanation of preparation processes, and the use amount thereof is preferably 1/3000 to 1/10 parts by weight, particularly preferably 1/600 to 1/20 parts by weight, with respect to one part by weight of water. The water-absorptive high-molecular weight substances are preferably in the form of particles or granules because they are easily dispersed in water in such forms. The particle diameter is suitably 60 μm or smaller, preferably 40 μm or smaller.

The release sheet may be suitably selected from those usable in the art. Examples of the release sheets are silicone coated sheets and silicone coated films. The thickness of the release sheet is not particularly limited as far as it can be industrially set in usual.

The porous or permeable backing may be suitably selected from those usable in the art. Examples of the porous or permeable backings are woven and non-woven cloth, a synthetic resin product in a coarse mesh, a permeable polymeric expanded sheet and a permeable polymeric film. The permeable backing may be a non-porous backing as far as it has permeability.

The permeable pores in the pressure sensitive adhesive layer composing the permeable adhesive tape of the present invention are formed by use of a permeability-providing agent as described below. For this reason, the permeable pores in the pressure sensitive adhesive layer are not formed dependent on the size and the number of pores present in the porous or permeable backing. In other words, whether the backing may be porous or non-porous, the permeable pores can be formed to provide a desired permeability to the pressure sensitive adhesive layer.

The permeable adhesive tape of the present invention can be prepared by various processes, for example, by the following processes (1) and (2):

(1) Non-hollow elastic microspheres, hollow elastic microspheres or expandable microspheres are dispersed homogeneously in a permeability-providing agent in order to obtain a first dispersion. The first dispersion is dispersed in a solution of a pressure sensitive adhesive to which a crosslinker is optionally added, in order to obtain a second dispersion. The second dispersion is applied onto a release sheet, followed by drying, while the expandable microspheres, if used, are converted to hollow elastic microspheres, thereby to form a pressure sensitive adhesive layer having permeable pores containing non-hollow elastic microspheres or hollow elastic microspheres. Then a porous backing or a permeable backing is laminated on the pressure sensitive adhesive layer.

(2) Non-hollow elastic microspheres, hollow elastic microspheres or expandable microspheres are homogeneously dispersed in a system in which a permeability-providing agent and optionally a crosslinker are homogeneously dispersed in a solution of a pressure sensitive adhesive. This dispersion is applied onto a release paper, followed by drying, while the expandable microspheres, if used, are converted to hollow elastic microspheres, thereby to form a pressure sensitive adhesive layer having permeable pores containing non-hollow elastic microspheres or hollow elastic microspheres. Then a porous backing or a permeable backing is laminated on the pressure sensitive adhesive layer.

The above process (1) is now explained.

First, non-hollow elastic microspheres, hollow elastic microspheres or expandable microspheres are dispersed homogeneously in a permeability-providing agent to produce a first dispersion. The term "homogeneously" is used in this invention not in its strict sense but in such a sense as includes substantial homogeneousness through the description of the present invention.

Any permeability-providing agent can be used which can form permeable pores by the evaporation of water contained therein in the following drying step. Preferable the permeability-providing agent is a water-absorptive high-molecular weight substance which contains water. The use amount of the permeability-providing agent is preferably 5 to 100 parts by weight to 100 parts by weight of the solution of the pressure sensitive adhesive. Further, the use amount of the permeability-providing agent is preferably 10 to 40 parts by weight in the case of the rubber-base pressure sensitive adhesive, and 20 to 100 parts by weight, more preferably 25 to 75 parts by weight, and particularly preferably 30 to 70 parts by weight in the case of the acrylic pressure sensitive adhesive.

Examples of the non-hollow elastic microspheres include non-hollow elastic microspheres of urethane polymer such as ARTPEARL C-300 manufactured by Negami, Japan and non-hollow elastic microspheres of acrylic rubber such as ARTPEARL G-400 manufactured by the same company.

As the expandable microspheres, preferably used are those which are 5 to 30 μm in average particle diameter and expand 20 to 70 times (volume) to become hollow elastic microspheres in the final permeable adhesive tape product. For the hollow elastic microspheres and the expandable microspheres, EXPANCEL series manufactured by Japan Fillite Co., Ltd., Japan is suitable. Particularly, EXPANCEL 091DE80 (expanded) is preferable for the hollow elastic microspheres and EXPANCEL 642WU (its expansion temperature is 90 to 120° C.) is preferable for the expandable microspheres. Further, F-50D manufactured by Matsumoto, Japan can also be used as the expandable microspheres.

Furthermore, the expandable microspheres may be primarily expanded to some extent beforehand. Then these primarily expanded hollow elastic microspheres may be added to the adhesive solution and secondarily expanded through the drying step thereby to be converted to hollow elastic microspheres.

In this connection, water and the water absorbed in the water-absorptive macro molecular substance serve to form the permeable pores in the pressure sensitive adhesive layer.

Then the first dispersion is dispersed homogeneously in a solution of a pressure sensitive adhesive to which a crosslinker is optionally added to produce a second dispersion.

In the case where the pressure sensitive adhesive permits the first dispersion to be dispersed therein, the pressure sensitive adhesive may be used as it is. Where the pressure sensitive adhesive is too viscous to permit the dispersion of the first dispersion, an organic solvent may be added as desired. Examples of usable organic solvents are ethyl acetate, toluene, hexane, xylene and acetone.

The crosslinker serves to improve cohesive force of the pressure sensitive adhesive and retention of adhesion to an adherend. As the crosslinker, isocyanate crosslinkers are preferred and multifunctional isocyanate compounds having at least two isocyanate groups are more preferred. Examples of such compounds are tolylene diisocyanate (TDI), diphenylmethane diisocyanate (MDI), toluidine diisocyanate (TODI), xylylene diisocyanate (XDI), hexamethylene diisocyanate (HMDI), trimethylolpropane (TMP)-TDI adduct, multifunctional aromatic polyisocyanates (TDI polymer, etc.), polymethylenepolyphenyl isocyanate, and partially modified compounds thereof. Preferably 0.5 to 10 parts by weight of the crosslinker is added to 100 parts by weight of the pressure sensitive adhesive. Other usable crosslinkers include those which can be used for crosslinking a pressure sensitive adhesive. Examples of such crosslinkers are aziridine compounds, epoxy compounds, metal chelate compounds, melamine compounds, and modified isocyanate compounds described in U.S. Pat. No. 5,198,064.

To the second dispersion, a tackifier, a plasticizer, an anti-oxidant, a colorant and a preservative may be added.

Then, the second dispersion is applied onto a release sheet and dried to form a pressure sensitive adhesive layer. These applying and drying steps can be performed using known methods. For example, in the drying step, a multi-zone drying using several zones different in temperature and air flow can be performed. Where the expandable microspheres are used, the expandable microspheres may be subjected to an expansion step after the drying step, but it is more preferred to perform the drying and expansion steps simultaneously under conditions allowing both the steps. Such conditions varies depending on what expandable microspheres are used, but heating at 80 to 200° C. for 0.5 to 5 minutes is preferable. Where the non-hollow elastic microspheres or hollow elastic microspheres are used, on the other hand, heating at 40 to 120° C. for 1 to 10 minutes is preferable.

Then a porous backing or a permeable backing is laminated on the pressure sensitive adhesive layer thereby to obtain a permeable adhesive tape.

The permeable adhesive tape is taken up in a roll usually with the release sheet.

Next, the process (2) is explained. This process is carried out in the same manner as the above-described process (1) except that the materials composing the pressure sensitive adhesive layer are homogeneously dispersed all at once.

In this connection, both the adhesive tapes prepared by the processes (1) and (2) do not lose their permeability greatly when receiving the winding pressure, unlike the conventional permeable tapes that do not contain the elastic microspheres.

It is considered that the following mechanism explains the reason why the permeable adhesive tape of the present invention retains its permeability.

The conventional permeable tape receives winding pressure when taken up in a roll so that the pressure sensitive adhesive layer thereof is fluidized to move in the direction of blocking permeable pores. This movement of the pressure sensitive adhesive layer takes place remarkably around the center where the winding pressure is relatively great. As the winding pressure remains applied, the permeable pores are narrowed and almost blocked up. Once the permeable adhesive tape falls into such a state, the permeable adhesive tape cannot recover its initial state even if the pressure is relieved, so that the permeability deteriorates.

On the other hand, the permeable tape of the present invention also receives winding pressure when taken up in a roll, but the elastic microspheres existing in all or at least part of, preferably at the inner wall of, the permeable pores are considered to be capable of preventing the permeable pores from being blocked by the fluidization of the pressure sensitive adhesive layer. When the permeable adhesive tape is relieved from the pressure, the elastic microspheres recover their shape so that space is ensured. Therefore the deterioration of the permeability is considered to be hindered or eased.

In addition, the permeable adhesive tape of the present invention is preferably used for adhesive plasters, dressings and surgical pads, but the use thereof is not limited thereto. The permeable adhesive tape of the present invention is applicable to use which needs the retention of permeability.

EXAMPLES

The present invention is described in further detail by way of examples, which are not intended to limit the scope of the invention. In these examples, the permeability of permeable adhesive tapes is represented by measurements of moisture permeability.

Example 1

Non-hollow elastic microspheres of ARTPEARL C-300 (urethane polymer microspheres of 15 $\mu$m average particle diameter produced by Negami) were used as the elastic microspheres. These microspheres were homogeneously mixed with 50 parts by weight of a permeability-providing agent (water-containing AR-739M, a water-absorptive high-molecular weight substance produced by Rikidyne, Japan) with varying the use amount of the microspheres to obtain first dispersions. These first dispersions were then homogeneously mixed with 100 parts by weight of a solution of an acrylic pressure sensitive adhesive (RIKIDYNE AR-2045, a product containing 45 wt % solid content produced by Rikidyne). Further 5 parts by weight of a modified polyisocyanate crosslinker (SANPASTER HD-739D produced by Rikidyne) were added and homogeneously mixed. Thus second dispersions were obtained.

The above second dispersions were applied onto silicone release sheets by a decalcomania process. The applied amount was 50 g/m$^2$/after drying. Then these dispersions were dried at 105 to 120° C. for 3 minutes. Permeable backings of a laminate composite of non-woven cloth (BENLIZE CF-501 produced by Asahi Chemical Industry Co., Ltd., Japan) and a urethane film of 25 $\mu$m in thickness (Okura, Japan) were laminated thereon. Thus permeable adhesive tapes were obtained.

The obtained permeable adhesive tapes were allowed to stand under at 40° C. a load of 80 g/cm$^2$ for 3 days and for 14 days. The moisture permeability of the obtained adhesive tapes was measured according to JIS L-1099-$_{1993}$ A-2 (water)Test (represented with g/m$^2$ 24 hours). The measurement results are shown together with adhesion strength for each use amount of the non-hollow elastic microspheres in Table 1. The adhesion strength was measured when adherent surfaces of the tapes were contacted with adherends (glass plates), pressure-bonded by moving a rubber roller of 2 kg in weight back and forth once, and immediately peeled off at an angle of 180° at a head speed of 300 mm/minute.

TABLE 1

| | at 40° C. under a load of 80/cm$^2$ | | | |
|---|---|---|---|---|
| Use Amount | after 3 days | | after 14 days | |
| of ARTPEARL C-300 (parts by weight) | Moisture permeability (g/m$^2$ - 24 hrs) | Adhesion strength (at 180° peel) (g/25 mm) | Moisture permeability (g/m$^2$ - 24 hrs) | Adhesion strength (at 180° peel) (g/25 mm) |
| 0 | 700 | 760 | 550 | 770 |
| 0.25 | 1208 | 725 | 1300 | 690 |
| 0.50 | 1495 | 680 | 1469 | 690 |
| 1.00 | 1569 | 625 | 1544 | 625 |

Table 1 shows that the permeable adhesive tapes containing the non-hollow elastic microspheres retain moisture permeability, that is, permeability, after receiving pressure.

Example 2

Permeable adhesive tapes were prepared in the same manner as described in Example 1 except that ARTPEARL G-400 (acrylic rubber microspheres of 20 $\mu$m average particle diameter produced by Negami) was used as the non-hollow elastic microspheres in stead of ARTPEARL C-300. The prepared permeable adhesive tapes were tested on moisture permeability and adhesion strength after 3 days and 14 days in the same manner as described in Example 1. The results are shown in Table 2.

TABLE 2

| | at 40° C. under a load of 80/cm$^2$ | | | |
|---|---|---|---|---|
| Use Amount | after 3 days | | after 14 days | |
| of ARTPEARL G-400 (parts by weight) | Moisture permeability (g/m$^2$ - 24 hrs) | Adhesion strength (at 180° peel) (g/25 mm) | Moisture permeability (g/m$^2$ - 24 hrs) | Adhesion strength (at 180° peel) (g/25 mm) |
| 0 | 700 | 760 | 550 | 770 |
| 0.25 | 1235 | 635 | 1078 | 650 |
| 0.50 | 1405 | 617 | 1390 | 625 |
| 1.00 | 1499 | 605 | 1428 | 610 |

Table 2 shows that the permeable adhesive tapes containing the non-hollow elastic microspheres retain moisture permeability, that is, permeability, after receiving pressure.

Example 3

Permeable adhesive tapes were prepared in the same manner as described in Example 1 except that hollow elastic microspheres (EXPANCEL 091DE80 of about 60 times expansion, 0.03 true specific gravity, 0.020 bulk specific gravity, 50 to 80 μm particle diameter produced by Japan Fillite Co., Ltd.). Further the prepared permeable adhesive tapes were tested on moisture permeability and adhesion strength after 3 days and 14 days in the same manner as described in Example 1. The results are shown in Table 3.

TABLE 3

| Use Amount of EXPANCEL 091DE (parts by weight) | after 3 days | | after 14 days | |
|---|---|---|---|---|
| | Moisture permeability (g/m² - 24 hrs) | Adhesion strength (at 180° peel) (g/25 mm) | Moisture permeability (g/m² - 24 hrs) | Adhesion strength (at 180° peel) (g/25 mm) |
| 0 | 749 | 298 | 530 | 290 |
| 0.25 | 1554 | 327 | 1541 | 360 |
| 0.50 | 1468 | 285 | 1601 | 280 |
| 1.00 | 1485 | 280 | 1603 | 278 |

Table 3 shows that the permeable adhesive tapes containing the hollow elastic microspheres retain moisture permeability, that is, permeability, after receiving pressure.

Example 4

Permeable adhesive tapes were prepared in the same manner as described in Example 3 except that 100 parts by weight of a rubber-base pressure sensitive adhesive solution (GR-700, a natural rubber/SBR base adhesive containing 30 wt % solid content produced by Rikidyne) and 30 parts by weight of the permeability-providing agent were used. Further the prepared permeable adhesive tapes were tested on moisture permeability and adhesion strength after 3 days and 14 days in the same manner as described in Example 1. The results are shown in Table 4.

TABLE 4

| Use Amount of EXPANCEL 091DE (parts by weight) | after 3 days | | after 14 days | |
|---|---|---|---|---|
| | Moisture permeability (g/m² - 24 hrs) | Adhesion strength (at 180° peel) (g/25 mm) | Moisture permeability (g/m² - 24 hrs) | Adhesion strength (at 180° peel) (g/25 mm) |
| 0 | 824 | 196 | 571 | 199 |
| 0.1 | 1315 | 254 | 1302 | 198 |
| 0.2 | 1572 | 200 | 1627 | 185 |
| 0.3 | 1688 | 185 | 1631 | 180 |

Table 4 shows that the permeable adhesive tapes with the rubber-base pressure sensitive adhesive also retain the moisture permeability, that is, permeability, after receiving pressure.

Example 5

Permeable adhesive tapes were prepared in the same manner as described in Example 3. However, in this example, a rubber-base pressure sensitive adhesive solution (GR-700, a natural rubber/SBR base containing 30 wt % solid content produced by Rikidyne) was used as the pressure sensitive adhesive solution, expandable microspheres (F-50D, an unexpanded microspheres of 10 to 20 μm particle diameter produced by Matsumoto) were used instead of the hollow elastic microspheres. The expandable microspheres were expanded 40 folds during a drying step at 115° C. for 5 minutes. The prepared permeable adhesive tapes were tested on moisture permeability in the same manner as described in Example 1. The results are shown in Table 5.

TABLE 5

| Use amount of F-50D (parts by weight) | Moisture Permeability (g/m² - 24 hrs) | |
|---|---|---|
| | after 3 days | after 14 days |
| 0 | 824 | 571 |
| 0.1 | 1138 | 1156 |
| 0.2 | 1242 | 1154 |
| 0.3 | 1533 | 1569 |

Table 5 shows that, when the expandable microspheres are used as a material, the moisture permeability, that is, permeability, of the permeable adhesive tapes is retained after receiving pressure if the expandable microspheres are expanded into hollow elastic microspheres before the pressure is received.

Example 6

Monomers composed of 65 parts by weight of butyl acrylate (BA), 30 parts by weight of 2-ethylhexyl acrylate (2EHA), 2 parts by weight of acrylic acid (Aa) and 3 parts by weight of vinyl pyrrolidone (NV-2P) were polymerized at 70° C. for 8 hours using ethyl acetate/toluene (in a ratio of 60/40 by weight) as a solvent and 0.2 parts by weight of BPO as an initiator. This polymerization produced a polymeric solution (a pressure sensitive adhesive solution) having 45% solid content and a viscosity of 6500 cp (at 25° C.).

Permeable adhesive tapes were prepared in the same manner as described in Example 3 except that the above polymeric solution was used instead of the acrylic pressure sensitive adhesive solution (RIKIDYNE AR-2045 produced by Rikidyne). The prepared permeable adhesive tapes were tested on moisture permeability and adhesion strength after 3 days in the same manner as described in Example 1. The results are shown in Table 6.

TABLE 6

| | Blank | Hollow elastic microspheres | | | Expandable microspheres | | |
|---|---|---|---|---|---|---|---|
| Polymer | 100 | 100 | 100 | 100 | 100 | 100 | 100 |
| AR-739M (Permeabil-ity-providing agent) | 50 | 50 | 50 | 50 | 50 | 50 | 50 |
| 91DE80 | — | 0.25 | 0.5 | 1.0 | — | — | — |
| F-50D | — | — | — | — | 0.25 | 0.5 | 1.0 |
| HD739D(Crossl inker) | 5 | 5 | 5 | 5 | 5 | 5 | 5 |
| Moisture permeability (g/m² - 24 hrs) | 1087 | 1361 | 1507 | 1870 | 1140 | 1310 | 1561 |
| Adhesion strength (g/25 mm) | 319 | 375 | 323 | 295 | 390 | 360 | 321 |

Table 6 shows that in the case of the hollow elastic microspheres are used, a desired moisture permeability can be obtained even with a relatively small use amount thereof and that the hollow elastic microspheres are superior to the expandable microspheres in efficiency of improving the moisture permeability.

Example 7

Hollow elastic microspheres were homogeneously dispersed in a system wherein a permeability-providing agent and a crosslinker were homogeneously mixed with an acrylic pressure sensitive adhesive solution (RIKIDYNE AR-2045 produced by Rikidyne) with varying the use amount of the microspheres. Each of the obtained dispersions was applied onto a release sheet and dried to form pressure sensitive adhesive layer. Then the permeable composite of laminated urethane film and non-woven cloth as used in Example 1 was laminated on the pressure sensitive adhesive layer to produce an adhesive tape. The produced adhesive tapes were tested on moisture permeability and adhesion strength under the same conditions as in Example 1 (except that the tapes were tested after having been allowed to stand for 10 days). The results are shown in FIG. 7. In this example, the materials used for composing the adhesive tapes were the same as used in Example 3.

TABLE 7

| Use amount of EXPANCEL 091DE (parts by weight) | after 10 days | |
|---|---|---|
| | Moisture permeability (g/m² - 24 hrs) | Adhesion strength (180° peel) (g/25 mm) |
| 0 | 729 | 325 |
| 0.25 | 988 | 375 |
| 0.5 | 1334 | 327 |
| 1.0 | 1595 | 246 |

Table 7 shows that as the use amount of the hollow elastic microspheres increases, the moisture permeability improves more.

Example 8

The second dispersions of Example 3 were applied onto silicon release sheets by the decalcomania process and dried. Then 25 μm thick urethane films (produced by Okura) were laminated thereon to obtain permeable adhesive tapes. The use amount and drying conditions were the same as described in Example 1.

The obtained permeable adhesive tapes were allowed to stand under the same conditions as described in Example 1. The moisture permeability after then was measured in the same manner as described in Example 1. The results are shown in Table 8.

TABLE 8

| Use amount of EXPANCEL 091DE | Moisture permeability (g/m² - 24 hrs) | |
|---|---|---|
| (parts by weight) | after 3 days | after 14 days |
| 0 | 550 | 320 |
| 0.125 | 800 | 710 |
| 0.25 | 980 | 880 |
| 0.5 | 1100 | 1010 |
| 1.0 | 1340 | 1280 |

Table 8 shows that the permeable adhesive tapes without any non-woven cloth also retain the permeability after time has passed.

Comparative Example 1

Permeable adhesive tapes were prepared in the same manner as described in Example 1 except that a microsphere pigment (DECOSOFT WHITE 15 (trade name) of 28 μm average particle diameter produced by C.U.Chemie Uetikon AG) which is a crosslinked nonelastic polyurethane-polyurea copolymer was used instead of ARTPEARL C-300. Then, the moisture permeability was measured after 3 days and 14 days in the same manner as described in Example 1. The results are shown in Table 9.

TABLE 9

| Use amount of DECOSOFT WHITE 15 | Moisture permeability at 40° C. under 80 g/cm² load | |
|---|---|---|
| (parts by weight) | after 3 days | after 14 days |
| 0 | 832 | 753 |
| 0.25 | 970 | 934 |
| 0.5 | 850 | 800 |

Table 9 shows that the elasticity of microspheres is important in improvement and retention of the moisture permeability.

Comparative Example 2

The moisture permeability was measured under the same conditions as described in Example 1 except that glass microspheres [of 22 μm average particle diameter, 2.47 true specific gravity, 1.73 bulk specific gravity (assumed that the microspheres contained 30% air), produced by Nippon Ferro] were used instead of the elastic microspheres. However, the measurement was carried out after tapes were allowed to stand at 40° C. under an 80 g/cm² load for 3 days. The results are shown in Table 10.

TABLE 10

| Use amount of Glass microspheres (parts by weight) | at 40° C. under 80 g/cm² after 3 days | |
|---|---|---|
| | Moisture permeability (g/m² - 24 hrs) | Adhesion strength (180° peel) (g/25 mm) |
| 0 | 542 | 291 |
| 0.5 | 744 | 303 |
| 1.0 | 705 | 306 |
| 2.0 | 648 | 288 |
| 3.0 | 607 | 281 |

Table 10 shows that the elasticity of microspheres is important in improvement and retention of the moisture permeability.

Comparative Example 3

The moisture permeability was measured under the same conditions as described in Example 1 except that rigid microspheres of crosslinked methylmetacrylic polymer (non-hollow microspheres of 30 μm average particle diameter, 1.18 true specific gravity and 0.862 bulk specific gravity produced by Ganz) were used instead of the elastic microspheres. However, the measurement was carried out after tapes were allowed to stand at 40° C. under an 80 g/cm² load for 3 days. The results are shown in Table 11.

In this connection, in the case where the rigid microspheres were used in the same volume as that of the elastic microspheres used in Example 1, the obtained dispersion was not usable for coating because of difference in specific gravity.

TABLE 11

| Use amount of rigid microspheres (parts by weight) | after 3 days (80 g/cm² × 40° C.) | |
|---|---|---|
| | Moisture permeability (g/m² - 24 hrs) | Adhesion strength (180° peel) (g/25 mm) |
| 0 | 639 | 313 |
| 0.125 | 859 | 322 |
| 0.25 | 807 | 294 |
| 0.50 | 818 | 298 |
| 1.00 | 857 | 307 |

Table 11 shows that the moisture permeability does not improve with an increase in the use amount of the microspheres. From Comparative Example 3, the elasticity of microspheres is important in improvement of the moisture permeability.

Comparative Example 4

A system containing the ingredients of the dispersion of Example 3 except the permeability-providing agent was used. That is, hollow elastic microspheres (EXPANCEL 091DE80 of about 60 times expansion produced by Japan Fillite Co., Ltd.) or expandable microspheres (F-50D, unexpanded microspheres produced by Matsumoto) were added to 100 parts by weight of the acrylic pressure sensitive adhesive (RIKIDYNE AR-2045 produced by Rikidyne) and 5 parts by weight of the polyisocyanate crosslinker (SANPASTER HD-739D produced by Rikidyne) in ratios shown in the following Table 12, and homogeneously mixed. These dispersions were applied onto silicone release sheets by the decalcomania process. The applied amount was 50/m²/after drying. Then, the sheets were subjected to a drying operation at 105 to 110° C. for 3 minutes in the case of the hollow elastic microspheres, and at 115° C. for 5 minutes for the expandable microspheres. Then composite permeable backings of laminated non-woven cloth (BENLIZE CF-501 produced by Asahi Chemical Industry Co., Ltd.) and 25 μm thick urethane film (produced by Okura) were laminated thereon to obtain permeable adhesive tapes.

The obtained permeable adhesive tapes were allowed to stand at 40° C. under a load of 80 g/cm² for 3 days as described in Example 1. The moisture permeability of the permeable adhesive tapes was measured for each use amount of the hollow elastic microspheres according to JIS L- 1099-$_{1993}$ A-2 (water) test (represented with g/m² 24 hours). The results are shown in Table 12.

TABLE 12

| | Blank | Hollow elastic microspheres | | | Expandable microspheres | | |
|---|---|---|---|---|---|---|---|
| Polymer | 100 | 100 | 100 | 100 | 100 | 100 | 100 |
| 91DE80 | — | 0.25 | 0.5 | 1.0 | — | — | — |
| F-50D | — | — | — | — | 1.0 | 2.0 | 3.0 |
| HD739D(Crosslinker) | 5 | 5 | 5 | 5 | 5 | 5 | 5 |
| Moisture permeablity (g/m² - 24 hrs) | 218 | 284 | 407 | 582 | 281 | 342 | 415 |

Table 12 shows that in the cases where the permeability-providing agent was not used, the moisture permeability was generally low. The moisture permeability tends to slightly improve with increase of the use amount of the hollow elastic microspheres and the expandable microspheres, but the observed moisture permeability was a long way from being practically usable.

The permeable adhesive tape of the present invention contains elastic microspheres in all or part of permeable pores, preferably at the inner walls of the permeable pores. Therefore, even though the tape receives winding pressure when the tape is wound up in a roll, the pores can be prevented from being blocked by the fluidization of the pressure sensitive adhesive layer. When the permeable adhesive tape is released from the pressure, the elastic microspheres recover their original shape to ensure spaces, and thus the deterioration of the permeability can be prevented or eased.

Additionally, according to the process for preparing the permeable adhesive tape of the present invention, the permeable adhesive tape having the above-described effects can be easily and conveniently produced.

What is claimed is:

1. A permeable adhesive tape comprising:
   a porous or permeable backing;
   a pressure sensitive adhesive layer of a natural rubber-base, synthetic rubber-base or acrylic pressure sensitive adhesive; and
   a release sheet in this order,
   wherein the pressure sensitive adhesive layer has homogeneous dispersion of permeable pores containing elastic microspheres, the elastic microspheres are contained in all of or part of the permeable pores in such a degree that elastic microspheres do not spoil permeability.

2. The permeable adhesive tape of claim 1, wherein the elastic microspheres are contained 0.01 to 5.0 parts by weight to 100 parts by weight of the pressure sensitive adhesive (in terms of solid content).

3. The permeable adhesive tape of claim 1, wherein the elastic microspheres have an average particle diameter of 10 to 100 μm.

4. The permeable adhesive tape of claim 1, wherein the elastic microspheres are non-hollow elastic microspheres or hollow elastic microspheres.

5. The permeable adhesive tape of claim 1, wherein the hollow elastic microspheres are expanded hollow elastic microsphere.

6. The permeable adhesive tape of claim 1, wherein the permeable adhesive tape is wound up in a roll.

* * * * *